US005655089A

United States Patent [19]

Bucci

[11] Patent Number: 5,655,089
[45] Date of Patent: Aug. 5, 1997

[54] METHOD FOR THE CONSOLIDATION SUMMARIZATION AND TRANSMISSION OF A PLURALITY OF MAILABLE MATERIALS

[76] Inventor: Joseph J. Bucci, 9 Carlisle Ct., Hazlet, N.J. 07730

[21] Appl. No.: 866,487

[22] Filed: Apr. 10, 1992

[51] Int. Cl.$^6$ .................................................. G06F 17/60
[52] U.S. Cl. .................. 395/240; 395/241; 395/234; 395/200.34; 395/200.36; 235/379; 235/380; 379/134; 379/135; 364/464.11
[58] Field of Search ................... 364/401, 464.01, 364/464.02, 464.04; 235/379, 380; 395/200.01, 200.04, 200.08, 200.17, 240, 241, 234; 379/92, 134, 135; 370/80, 99

[56] References Cited

U.S. PATENT DOCUMENTS

| | | | |
|---|---|---|---|
| 3,852,571 | 12/1974 | Hall et al. | 235/379 |
| 4,485,300 | 11/1984 | Pierce | 235/380 |
| 4,701,601 | 10/1987 | Francini et al. | 235/449 |
| 4,734,564 | 3/1988 | Boston et al. | 235/380 |
| 4,839,504 | 6/1989 | Nakano | 235/379 |
| 4,893,248 | 1/1990 | Pitts et al. | 364/464.01 |
| 4,905,826 | 3/1990 | Spencer | 235/379 |
| 4,949,272 | 8/1990 | Vanourek et al. | 364/464.02 |
| 5,206,488 | 4/1993 | Teicher | 235/380 |
| 5,220,501 | 6/1993 | Lawlor et al. | 364/408 |
| 5,283,829 | 2/1994 | Anderson | 380/24 |
| 5,287,270 | 2/1994 | Hardy et al. | 364/408 |
| 5,325,290 | 6/1994 | Cauffman et al. | 364/401 |
| 5,326,959 | 7/1994 | Perazza | 235/379 |
| 5,383,113 | 1/1995 | Kight et al. | 395/240 |
| 5,477,038 | 12/1995 | Levine et al. | 235/380 |
| 5,483,445 | 1/1996 | Pickering | 364/406 |

FOREIGN PATENT DOCUMENTS 745947   4/1996   European Pat. Off. .

OTHER PUBLICATIONS

"Managing Utility Billing"; Jul./Aug. 1979. pp. 11–13. v7, n4. Avail.: IBM Corp.
"Time and billing software: seven packages . . . " Wolff, B.; Nov. 22, 1988.
"How to select a practice management system" By Levi, P.C. Nov. 24, 1989.
"Banking on PCs" by Edith Myers Jan. 1992.
"Citicorp Device Is Called for Home Banking" by Karen Gullo Mar. 1, 1990.
"Footing the Bills" by Briere et al.; Network World pp. 32–34 May 25, 1992.
"Consolidated third party collections" by James et al. Jun. 1992.
"The computer as communicator" by Zarowin, Stanley Apr. 1994.
"Electronic Bill Payment: Low–Cost . . . " bu Karen Gullo Jan. 27, 1992.

Primary Examiner—Gail O. Hayes
Assistant Examiner—Gita Shingala
Attorney, Agent, or Firm—Charles I. Brodsky

[57] ABSTRACT

Analysis has revealed that there is an undue proliferation of first-class mail being sent each month in the nature of bills, statements and similar such documents. Analysis has also revealed that this produces an unnecessary expense for postage and processing, besides the costs involved in purchasing the paper and envelopes to begin with.

The method of the invention avoids this through the single mailing of one or more two-sided documents on which is presented all the bills, statements, etc. intended for a given recipient during a specified period of time, for all subscribers to the service.

In accordance with the described embodiment of the invention, the method forms a computer database of addressee information; merges with that database all such record information provided by subscribers; prints out one or more sheets, preferably on both sides, of all information intended for designated recipients during the time period in question; and allows for a single mailing of such sheets in a single envelope.

9 Claims, No Drawings

METHOD FOR THE CONSOLIDATION SUMMARIZATION AND TRANSMISSION OF A PLURALITY OF MAILABLE MATERIALS

FIELD OF THE INVENTION

This invention relates to the mailing of bills, statements, advertising and other communications, to millions of homes and businesses each month.

BACKGROUND OF THE INVENTION

As is well known and understood, utility companies, insurance companies, credit card companies and such professionals as doctors, dentists and attorneys mail monthly bills or statements to their subscribers and/or clients—whether businesses or individuals—each month. As is also well known, banks and other financial institutions, membership clubs and a whole host of other entities similarly mail records, bills and other documents monthly. Analysis has revealed that each such mailing exhibits the following common characteristics: 1) a pre-printed bill/statement of a type generally purchased from a printer is employed; 2) the bill/statement is usually a half page of information; 3) the pre-printed form is "filled in" by computer; 4) a pre-printed return envelope, more frequently than not, is enclosed with the mailing, with the return envelope being purchased from a printer; 5) the bill/statement and return envelope (where utilized) are stuffed into an additional envelope for mailing; and 6) postage is applied to the envelope—now between 23¢ and 29¢ depending upon the class of mail and on the "zip-coding" and "bar-coding" utilized. Analysis has also revealed that these types of mailings produce an unnecessary expense for postage and processing, besides the costs involved in purchasing the paper and envelopes to begin with.

Research has revealed, however, that up to 5 sheets of 8½"×11" paper can be mailed in the same envelope, and still pay at the same 1 oz. rate.

Further research has shown that by printing on both sides of said sheet, one can effectively transmit by hard-copy mail 10 pages of information in a single 1 oz. mailing.

SUMMARY OF THE INVENTION

As will become clear from the following description, the method of the invention utilizes a concept of electronically combining many different forms of mailable materials, from many different subscribers, into a single package for mailing to an identified addressee. As will be seen, the recipient (or identified addressee) will receive, according to the invention a one or more page summary of all bills and statements that heretofore were received in individual envelopes. As will be understood, this will result in a significant reduction in time spent in fumbling through junk mail to find one's bills, a significant reduction in figuring out who gets paid what, and offers the possibility of writing out only one check, or less each month, instead of multiple checks, and only having to mail out a single envelope, or less with one stamp per month.

As will be more clearly understood, the method of invention avoids this undue proliferation of receiving bills, statements and other records through the single mailing of one or more two-sided documents (8½"×11") on which is presented all the bills, statements, etc. intended for a given recipient during a specified period of time, for all subscribers to the service. As described, the method will be seen to be one which forms a computer database of addressee information; merges with that database all such record information provided by subscribers; prints out one or more sheets, preferably on both sides of all information intended for a designated recipient during the time period in question; and allows for a single mailing of such sheets in a single envelope.

As will also be described, the operator of this Universal Mail Transmittal Service—once the database is established in a computer as to intended addressees—merely inputs into the computer such information as to bills, statements and records as provided for these addressees during a given time interval, either by receiving such input information electronically from a subscriber to the Universal Mail Service, or by "hard-copy" from such subscriber.

As will be appreciated, not only will the method of the invention be seen to be simple to formulate and carry-out, but the combining of bills and statements from many sources will be seen to produce a large cost savings. Not only does there result the savings in postage and purchasing papers and envelopes for sending the information, but a measurable savings additionally results in being able to send multiple pages of information in a standard #10 business envelope while still qualifying for first-class mailing. Additionally, and as will be apparent, less paper, sending also means fewer forests have to be levelled, less paper has to go to landfills and incinerators every year; and greater reductions in the numbers of plastic garbage bags that would otherwise be necessary to carry all the used paper.

DETAILED DESCRIPTION OF THE INVENTION

As is appreciated, such businesses as American Express, AT&T, Blue Cross/Blue Shield, Sears, and Merrill Lynch send out monthly statements to their customers each month. As will also be appreciated, each of those customers is identified by a specific, individual unique code. The same is true with banks, utility companies, insurance companies, governmental agencies, etc. who all identify their intended recipient by a code number developed within their respective operations. In accordance with the present invention, all subscribers to the Universal Mail Transmittal Service method will provide such codes for their customers—which are then transformed by the operator of the Universal Mail Service into a single code which identifies that particular business or entity for all system subscribers. Such database of intended addressees is formed and is stored in a computer. Such code thereafter identifies the intended recipient for all future transmissions.

The next step in the method of the invention is the inputting of information into the computer as to the bills, statements and records for individual addressees to be combined and transmitted during a given period of time. Such step includes the receipt of such information from the subscriber to the service, either forwarded electronically to the computer by an appropriate modem, tape or disk provided it through a hard-copy mailing. With this information available, the operator of the Universal Mail Transmittal service then accumulates, according to the invention, a plurality of these input records for each identified addressee, according to the code associated with the business or individual. The computer software can thus be designed to enable the developing of at least one page of those accumulated input informations for that addressee who is to subsequently receive the billing information. Such a bill summary might appear as in the following table.

TABLE I

| BILLING COMPANY NAME | CURRENT BALANCE | PAYMENT DUE DATE | MINIMUM PAYMENT DUE | YOUR PAYMENT AMOUNT |
|---|---|---|---|---|
| Chemical Mortgage Co. | $752.00 | 01/01/92 | $752.00 | $ |
| J.C.P.&L. | $267.00 | 01/01/92 | $267.00 | $ |
| West Keansburgh Water | $240.10 | 01/15/92 | $240.00 | $ |
| Hazlet Twp. Sewerage | $65.00 | 01/15/92 | $65.00 | $ |
| Storer Cable | $42.25 | 01/15/92 | $42.25 | $ |
| Citibank Mastercard | $3,257.31 | 01/15/92 | $127.00 | $ |
| American Express | $247.68 | 01/15/92 | $247.68 | $ |
| Summary | $4,871.34 | | $1,740.93 | $ |

The method of the invention then sends such page of accumulated informations as in this Table to the identified addressee as a unitized transmission. As will be apparent, this can be sent either electronically to the addressee—but, in accordance with the invention, is more oftentimes to be sent through the United States Postal Service. In particular, the computer software can be arranged to print on both sides of an 8½"×11" sheet of paper—and investigation has shown that five such sheets can be mailed in a single envelope in a one ounce mailing.

As so far described, it will be understood that the Universal Mail Transmittal Service can be quite effective in reducing the number of pages of bill and statement papers mailed. This reduction is estimated as almost 20 billion pages in 1992 alone, just in the United States. As will also be seen, a significant cost savings would result as regards paper storage and disposal costs, postage costs, decreased costs for paper/envelopes, as well as significant cost savings as respects equipment purchasing and maintenance and personnel costs for each company or business to do the mailing itself.

At the same time, significant savings are reaped by the consumer-recipient, who now will receive only one envelope or less a month, which would include a one or more page summary of all bills and records. Such summary, as indicated in the table above, shows at a glance the name of the billing subscriber, the current balance, the minimum payment due, and the date upon which payment is due. In response, the consumer can send individual checks to each Billing Company, or can simply fill in the amount to be paid to each company, and forwarding to the operator of the Universal Mail Transmittal Service a single check for the total amount of all payments made, or may utilize quicker checkfree, telephone bank payment authorizations or other methods of payment which would require no checks or return postage, and which can then be credited to the various companies by the system operator. At the same time, the Universal Mail system can be used to create a large data base of consumer buying patterns, which can be used for targeted marketing, or for additional marketing by geographic areas. In similar fashion, other hard-copy material can be included in the single envelope carrying the one-page, or more, summary of all billing statements, to carry, as well, other hard-copy material in the nature of advertising or bill-breakdown information. In either event, a more cost effective, time saving and environmentally friendly transmittal service will result through this electronic combination of many forms of mailable materials, from different mailers into a single package for sending to the identified addressee. Not only will benefits be derived by the recipient—less fumbling, less time spent, easier record keeping —, but benefits are derived by the individual mailers who subscribe to the system and by everyone in the form of environmental benefits.

While there have been described what are considered to be preferred methods of carrying out the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A method for the consolidation, summarization and transmission of a plurality of mailable materials by a plurality of differing, non-related subscribers transmitting to a plurality of end users, comprising the steps of:

forming an information database in a computer as to the identities of intended end users of each non-related subscriber;

inputting individual information into the computer as to bills, statements, records, advertising and other written communications from each said non-related subscriber for each said identified end user during a given period of time;

accumulating a plurality of said input informations of bills, statements, records, advertising and other written communication from each said non-related subscriber, and sorting said accumulated input informations by each said identified end user;

developing at least one page of said sorted accumulated input informations for each said end user identified to receive said sorted accumulated input informations; and sending said page of sorted accumulated informations from said plurality of non-related subscribers to said individual identified end user to receive said page as a single, unitized transmission of all informations intended for said identified end user.

2. The method of claim 1 wherein said sending step electronically transmits said page of accumulated informations to identified end users.

3. The method of claim 1 wherein said developing step prints at least one sheet of said accumulated input informations.

4. The method of claim 3 wherein said sending step transmits said sheet of accumulated input informations to identified end users by hard-copy mail.

5. The method of claim 1 wherein said developing step prints at least one sheet of said accumulated input informations, printed on both sides thereof.

6. The method of claim 1 wherein said step of inputting informations also includes the step of receiving input information electronically from each said non-related subscriber.

7. The method of claim 1 wherein said step of inputting information also includes the step of receiving input information by hard-copy, paper, type or disk, from each said non-related subscriber.

8. The method of claim 1 wherein said developing step prints at least one sheet of said accumulated input informations, printed on both sides thereof, wherein said sending step transmits said sheet of accumulated input informations by hard-copy mail, and wherein said sending step transmits said accumulated input informations to an identified end user in a single envelope.

9. The method of claim 8 wherein said sending step additionally transmits other hard-copy material to an identified end user as an optional service available to a non-related subscriber.

* * * * *